US012759051B2

(12) United States Patent
Han

(10) Patent No.: US 12,759,051 B2
(45) Date of Patent: Oct. 13, 2026

(54) RECOATING DEVICE AND 3D PRINTER INCLUDING THE SAME

(71) Applicant: SAMYOUNG MACHINERY CO., LTD., Gongju-si (KR)

(72) Inventor: Kuk Hyun Han, Daejeon (KR)

(73) Assignee: Samyoung Machinery Co., Ltd., Gongju-si (KR)

( * ) Notice: Subject to any disclaimer, the term of this patent is extended or adjusted under 35 U.S.C. 154(b) by 247 days.

(21) Appl. No.: 18/712,936

(22) PCT Filed: Dec. 8, 2023

(86) PCT No.: PCT/KR2023/020159
§ 371 (c)(1),
(2) Date: May 23, 2024

(87) PCT Pub. No.: WO2024/143983
PCT Pub. Date: Jul. 4, 2024

(65) Prior Publication Data

US 2026/0166629 A1 Jun. 18, 2026

(30) Foreign Application Priority Data

Dec. 30, 2022 (KR) ........................ 10-2022-0191014

(51) Int. Cl.
*B22F 12/67* (2021.01)
*B22F 10/28* (2021.01)
(Continued)

(52) U.S. Cl.
CPC ............ *B22F 12/67* (2021.01); *B29C 64/214* (2017.08); *B33Y 30/00* (2014.12); *B22F 10/28* (2021.01); *B29C 64/153* (2017.08)

(58) Field of Classification Search
CPC .......... B22F 10/28; B22F 12/60; B22F 12/63; B22F 12/67; B22F 2999/00; B33Y 10/00;
(Continued)

(56) References Cited

U.S. PATENT DOCUMENTS 10,343,215 B2 7/2019 Pialot, Jr. et al.
11,453,159 B2 9/2022 Stroud et al.
(Continued)

FOREIGN PATENT DOCUMENTS

CN 107433714 A * 12/2017 .............. B22F 12/67
CN 217346742 U 9/2022
(Continued)

OTHER PUBLICATIONS

CN217346742U—Machine Translation (Year: 2022).*
CN107433714A—Machine Translation (Year: 2017).*

*Primary Examiner* — Yunju Kim
(74) *Attorney, Agent, or Firm* — DICKINSON WRIGHT PLLC

(57) ABSTRACT

The present invention relates to a recoating device that performs the function of evenly applying powder in a powder bed-type 3D printer and a 3D printer including the same. The recoating device of the present invention is formed to include a leveling blade that generates a flow of powder in a direction perpendicular to a moving direction of the recoating device, thereby evenly leveling powder even if the discharge amount of powder is uneven depending on a position at the front of the recoating device.

10 Claims, 8 Drawing Sheets

(51) Int. Cl.
*B29C 64/153* (2017.01)
*B29C 64/214* (2017.01)
*B33Y 30/00* (2015.01)

(58) Field of Classification Search
CPC ......... B33Y 30/00; B33Y 40/00; B33Y 40/10; B29C 64/214; B29C 64/153
See application file for complete search history.

(56) References Cited

U.S. PATENT DOCUMENTS

| | | | | |
|---|---|---|---|---|
| 2015/0139849 | A1 | 5/2015 | Pialot, Jr. et al. | |
| 2015/0367448 | A1* | 12/2015 | Buller ...................... | H05B 6/68 219/74 |
| 2021/0114289 | A1 | 4/2021 | Stroud et al. | |
| 2023/0044325 | A1 | 2/2023 | Han et al. | |

FOREIGN PATENT DOCUMENTS

| | | | |
|---|---|---|---|
| JP | 2015527942 | A | 9/2015 |
| KR | 101961683 | B1 | 3/2019 |
| KR | 101990309 | B1 | 6/2019 |
| KR | 102274844 | B1 | 7/2021 |

* cited by examiner

RECOATING DEVICE AND 3D PRINTER INCLUDING THE SAME

CROSS-REFERENCE TO RELATED APPLICATIONS

This application is a 35 U.S.C. § 371 national phase of PCT International Application No. PCT/KR 2023/020159, filed Dec. 8, 2023, which claims the benefit of priority under 35 U.S.C. § 119 to Korean Patent Application No. 10-2022-0191014, filed Dec. 30, 2022, the contents of which are incorporated herein by reference in its entirety.

FIELD

The present invention relates to a recoating device that performs the function of evenly applying powder in a powder bed-type 3D printer and a 3D printer including the same.

BACKGROUND 3D printing refers to a process of three-dimensionalizing electronic information for implementing a three-dimensional shape through an automated output device, and a device that performs 3D printing is referred to as a 3D printer. There are many 3D printing methods, and among them, in the case of 3D printing using powder, in order to print a product with fine-grained powder, powder is applied to the entire surface of a job box to have a thickness corresponding to a certain layer thickness and a binder is selectively jetted or a laser is selectively scanned to a predetermined desired region of deposited unsolidified powder to solidify the powder of the corresponding region.

The application and solidification process is carried out in one application layer, and a product to be manufactured is divided into several layers and powder application and selective solidification are repeated for each layer to create the desired shape, and finally, a solidified product surrounded with unsolidified powder is extracted, thereby completing the product.

Powder bed-type 3D printers deposit powder of a material to be deposited in thin layer thickness units and jetting a shape of a cross-section corresponding to a shape to be printed for each layer thickness with binder or ink or irradiate the same with a laser or electron beam, etc., which are repeated to finally produce a 3D-shaped output, and here, quality of lamination is largely determined by three factors. First, the amount of powder required for a layer thickness to be applied should be distributed evenly on a progress front surface of a recoating device. Secondly, the distributed powder should be adjusted to a flat height. Thirdly, a compaction operation should be performed to compress powder to reduce voids between powder particles in the layer thickness. In other words, each of powder ejection, powder layer thickness leveling, and powder layer thickness compaction is required.

Currently, many recoating devices have been released for the purpose of improving lamination quality, but powder lamination quality still has deviations in ejection amount of powder depending on printing environmental conditions or deviations in manufacturing recoating devices. In particular, an operation of eliminating deviations in uniformly ejecting and leveling powder along the progress front surface of recoating devices is an issue to be continuously addressed.

SUMMARY

An object of the present invention is to provide a recoating device capable of uniformly leveling powder even if the powder is unevenly ejected depending on a position at the front of the recoating device.

Another object of the present invention is to provide a recoating device capable of evenly leveling powder even if there is a large deviation in the ejection amount of powder due to changes in temperature and humidity conditions, recoating device movement speed conditions, recoating device vibration conditions, powder characteristic conditions, etc., as well as an ejection amount deviation depending on a position.

In one general aspect, a powder-based 3D printer includes: a build plate movable in a vertical direction and on which metal or non-metal powder is solidified and stacked; a recoating device applying powder on the build plate; a transfer device transferring the recoating device; a powder supply device supplying powder to the recoating device; and a laser scanning unit or a binder jetting unit to bond the applied powder, wherein the recoating device includes an ejector ejecting powder and a leveler leveling the ejected powder, the leveler includes a leveling blade formed to be adjacent to an ejection port of the ejector and leveling the ejected powder, and the leveling blade generates a flow of powder in a direction perpendicular to a movement direction of the recoating device.

The leveling blade may have a slope so that a central portion protrudes toward a powder ejection port in the horizontal direction and both sides are inclined toward the opposite side of the ejection port.

The leveling blade may be formed so that the protruding central portion has a certain curvature.

The leveling blade may be formed in a straight line with a protruding central portion having a certain length.

The leveling blade may include a plurality of V-shaped slopes.

The leveling blade may have a central portion indented opposite to the powder ejection port in the height direction.

The leveling blade may have a slope so that a central portion protrudes toward the powder ejection port in the horizontal direction and both sides are inclined toward the opposite side of the ejection port.

The indentation space may be defined by an indentation depth (d), a space height (h) of the indentation space, and an indentation angle (φ) from the bottom, and at least one of the indentation depth (d), space height (h), and indentation angle (φ) is formed to change depending on a position of the leveling blade.

The indentation depth (d) may be shallowest at a center of the leveling blade and become deeper toward both sides.

The space height (h) may be formed to be lowest at a center and higher on both sides.

The entry angle (φ) may be lowest at a center and is formed to change in the form of a sine wave on both sides.

An opening and closing device may be formed at an ejection port to open and close the ejection port, and the opening and closing device may be opened and closed according to a vibration frequency.

The recoating device may further include a compactor including an excitation device for compacting leveled powder, and the excitation device for compacting the leveled powder may be formed to be controlled independently of vibration for opening and closing the opening and closing device.

Through this means, the 3D printer of the present invention may level powder uniformly even if the ejection amount of powder is uneven depending on a position at the front of the recoating device.

In addition, the 3D printer of the present invention may evenly level powder even if there is a large deviation in the ejection amount of powder due to changes in temperature and humidity conditions, recoating device movement speed conditions, recoating device vibration conditions, powder characteristic conditions, etc., as well as a ejection amount deviation depending on a position.

In addition, it is possible to create a flow in which powder may be distributed by forming an indentation space in a height direction of a blade without increasing an overall size of the recoating device of the present invention.

DETAILED DESCRIPTION

Figure 1:
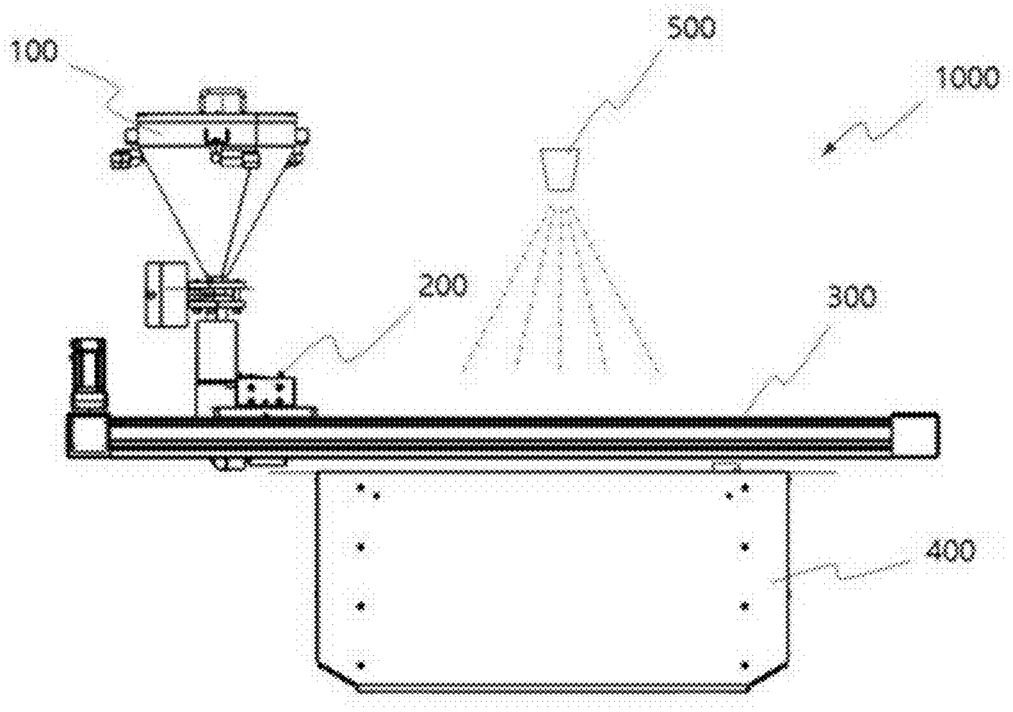
FIG. 1 is a diagram illustrating an overall shape of a 3D printer according to an exemplary embodiment of the present invention.

Specific exemplary embodiments and features of the present invention are described in detail with reference to the accompanying drawings. However, the present invention may be modified in many different forms and it should not be limited to the drawings and exemplary embodiments set forth herein. These exemplary embodiments may be provided so that this disclosure will be thorough and complete, and will fully convey the scope of the invention to those skilled in the art. The present invention is defined by the claims. Like reference numerals denote like elements throughout the description.

In the following description, when a detailed description of the relevant known function or configuration is determined to unnecessarily obscure the gist of the present disclosure, the detailed description will be omitted. The terms used henceforth are defined in consideration of the functions of the present disclosure, and may be altered according to the intent of a user or operator, or conventional practice. Therefore, the terms should be defined on the basis of the entire content of this specification.

Recently, as the use of 3D printing gradually changes from prototyping to mass-production, the size of 3D printers has increased. As the size of 3D printers has increased, the size of the recoating devices has also increased. Accordingly, no matter how meticulously recoating devices are manufactured, manufacturing deviations are bound to occur depending on the position. In particular, in the case of a method of ejecting powder by vibration, the dynamic characteristics of recoating devices change, resulting in a greater deviation in ejection amount by position.

In addition, in the mass-production environment, the constant temperature and humidity conditions at the time of development of the 3D printer are often exceeded, and as changes in conditions, such as changes in printing speed or powder materials, increase to increase a mass-production speed, deviations in ejection amount of powder may occur.

The present invention aims to solve the problem of ejection amount deviation and prevent powder lamination quality deviation from occurring depending on a powder ejection position to achieve high quality lamination.

Hereinafter, a recoating device and a 3D printer including the same according to an exemplary embodiment of the present invention are described with reference to the accompanying drawings.

FIG. 1 is a diagram illustrating an overall shape of a 3D printer according to an exemplary embodiment of the present invention. Referring to FIG. 1, a 3D printer according to an exemplary embodiment of the present invention includes a build plate movable in a vertical direction and on which metal or non-metal powder is solidified and deposited, a recoating device for applying powder onto the build plate, a transfer device for transferring the recoating device, a powder supply device for supplying powder to the recoating device, and a laser scanning unit or a binder jetting unit for bonding the applied powder.

A functional configuration of the powder bed-type recoating device may be largely divided into an ejector that ejects powder, a leveler that levels ejected powder, and a compactor that compacts a leveled powder layer. At this time, the ejector, leveler, and compactor may be manufactured separately or may be manufactured integrally. When the ejector, leveler, and compactor are integrated into a recoating device, a vibration necessary for powder ejection and a vibration necessary for compaction of the ejected powder may be provided at the same time, so that powder ejection and compaction of the powder layer may be simultaneously performed with a single vibration.

Figure 2:
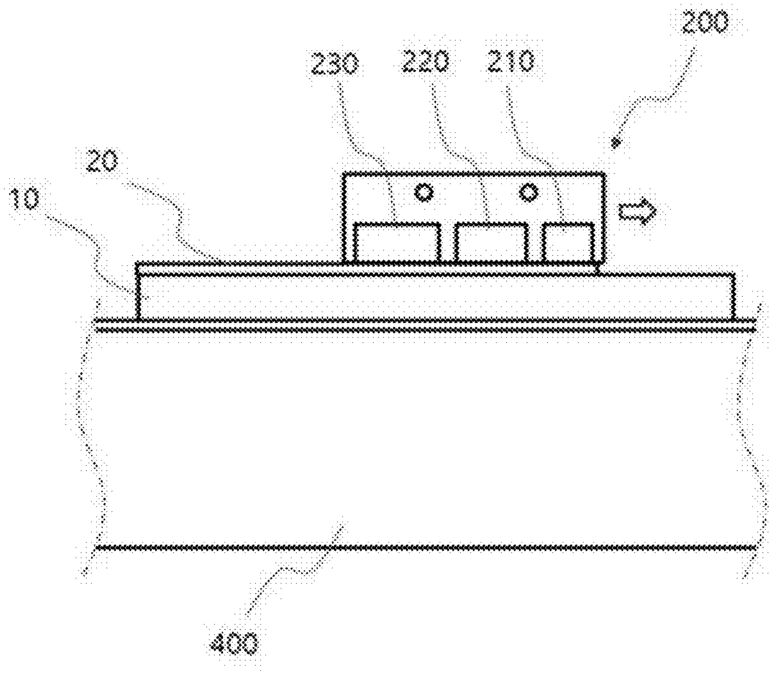
FIG. 2 is a conceptual diagram of an integrated recoating device according to an exemplary embodiment of the present invention.

FIG. 2 is a conceptual diagram of an integrated recoating device according to an exemplary embodiment of the present invention. The integrated recoating device may be implemented by disposing a leveler for powder levelling immediately behind an ejector including a powder supply tank and a powder supply ejection port and disposing a compactor for compacting a leveled powder layer immediately behind the leveler when a movement direction of the recoating device is assumed to be forward. At this time, powder ejection may be controlled by installing a separate vibrator or installing an opening/closing control device at the powder supply ejection port.

Figure 3:
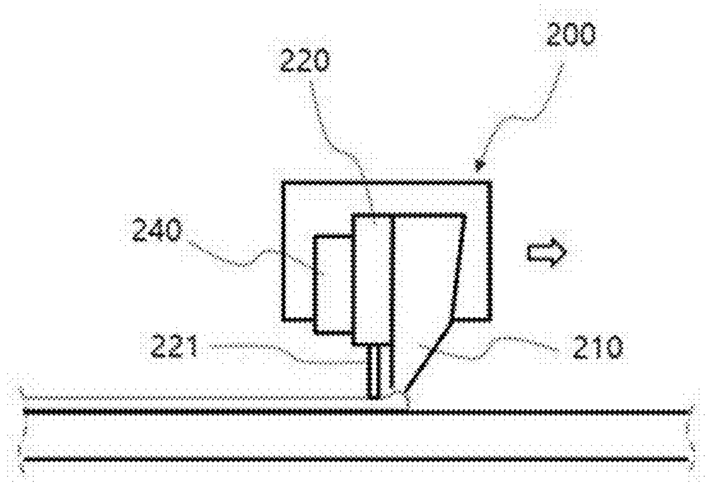
FIG. 3 is a conceptual diagram of a recoating device including an excitation device according to an exemplary embodiment of the present invention.

FIG. 3 is a conceptual diagram of a recoating device including an excitation device according to an exemplary embodiment of the present invention. A leveling blade for leveling may be installed immediately behind the powder supply ejection port of the powder supply tank and a vibrator may be attached to allow the leveling blade to vibrate up and down, so that the leveling blade may be implemented to perform compaction, while performing leveling at the same time, and at this time, the vibrator may transmit vibration to the ejector so that a certain amount of powder is ejected from the powder ejection port.

The implementation of the powder bed-type recoating device may be approached in a variety of manners, but functionally, ejector, leveler, and compactor elements are required, there should be a powder ejection port of the ejector, and a leveling blade is installed to be adjacent to the rear of the powder ejection port based on a direction of progress of the recoating device. The compaction function may be integrated into the blade or implemented by adding a separate mechanical element.

Figure 4:
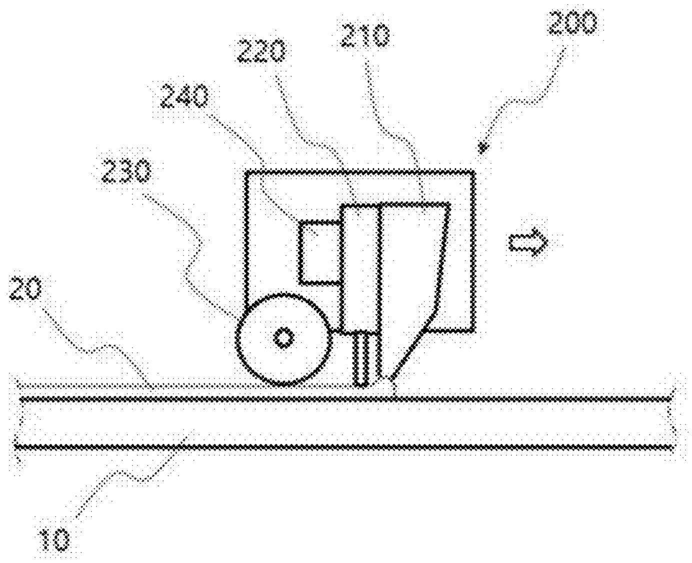
FIG. 4 is a conceptual diagram of a recoating device including a compactor according to an exemplary embodiment of the present invention.

FIG. 4 is a conceptual diagram of a recoating device including a compactor according to an exemplary embodiment of the present invention. Referring to FIG. 4, a compactor including a compaction roller is disposed behind the leveling blade, and a powder layer is compacted by rotating the compaction roller.

Figure 5:
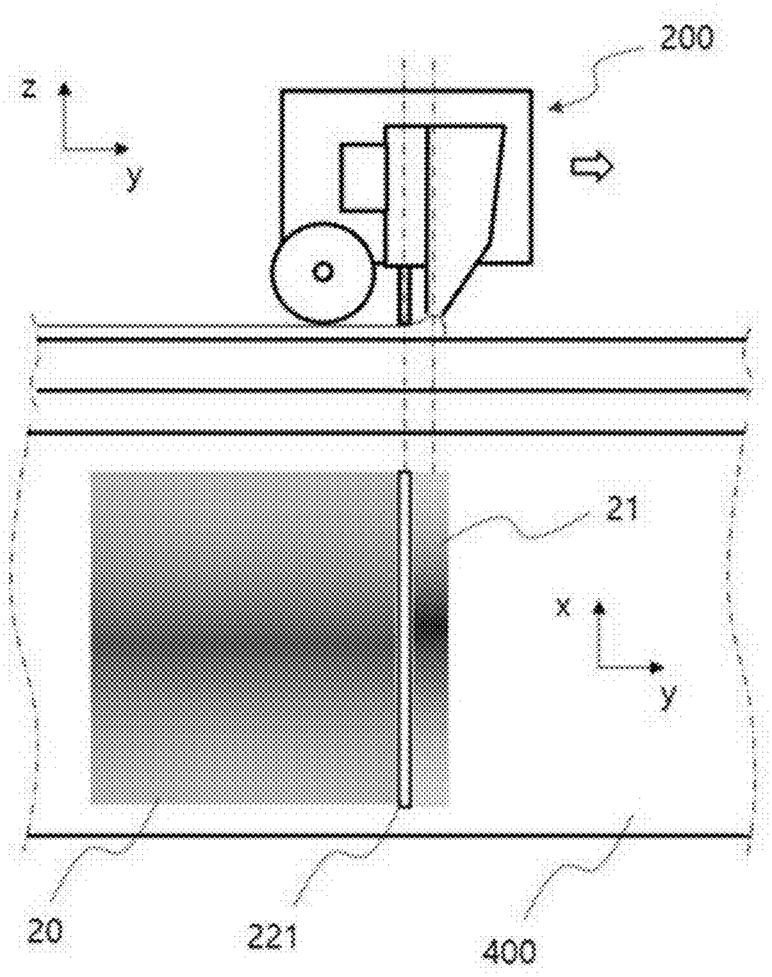
FIG. 5 is a conceptual diagram illustrating that powder is distributed to be unbalanced depending on the ejection amount deviation.

FIG. 5 is a conceptual diagram illustrating the unbalanced distribution of powder according to the ejection amount deviation. As described above, when a movement direction of the recoating device is y for reasons, such as enlargement of 3D printers, mass-production application, and vibration application, deviation in the ejection amount of powder may occur in the x direction, which is a width direction of the leveling blade, perpendicular to the movement direction y of the recoating device. For example, the portion marked to be dark in FIG. 5 is a portion with a large amount of powder, and if this is leveled as is, unevenness may be resolved to some extent through the leveling blade, but, even after leveling, unevenness may occur in the distribution of the powder, which ultimately affects quality of a deposit.

To solve this problem, it is necessary to distribute the amount of powder as much as possible and make it uniform through the leveling blade located adjacently at the rear of the powder ejector. In other words, it is necessary to move powder from a position with a large amount of powder to a position with an insufficient amount of powder, and to this end, the present invention proposes a structure in which powder is moved in the width direction x of the leveling blade perpendicular to the movement direction y of the recoating device.

Figure 6:
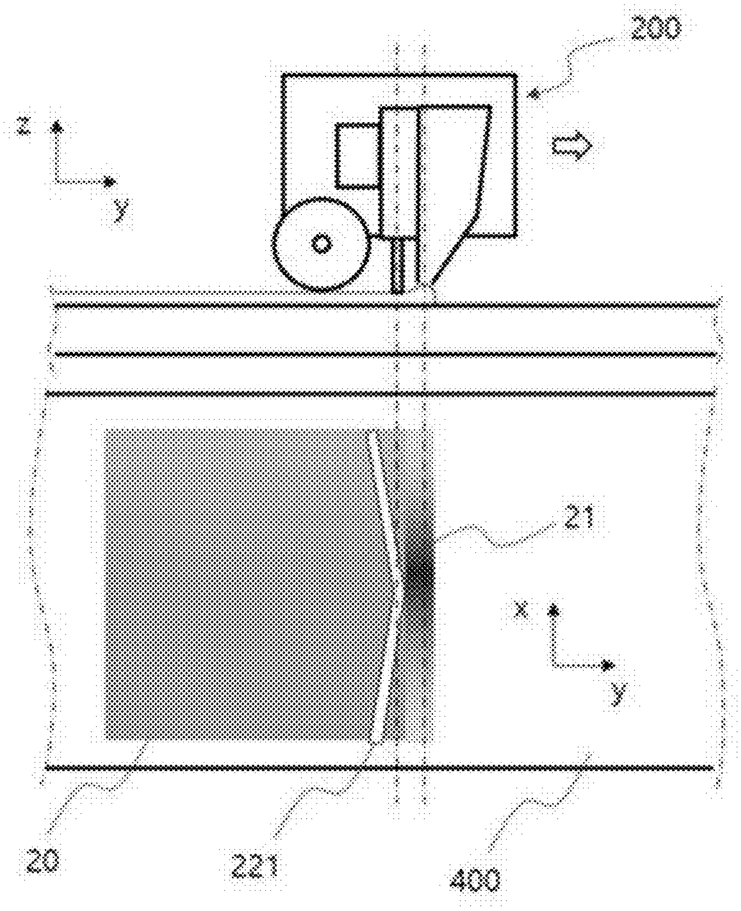
FIG. 6 is a conceptual diagram illustrating the effect of a leveling blade according to an exemplary embodiment of the present invention.

FIG. 6 is a conceptual diagram illustrating the effect of the leveling blade according to an exemplary embodiment of the present invention. Referring to FIG. 6, the leveling blade according to an exemplary embodiment of the present invention may have an inclined structure in which a central portion protrudes toward the powder ejection port in the horizontal direction and both sides are inclined toward the opposite side of the ejection port. That is, through the inclined structure in which the central portion protrudes, the powder may be moved from the center to both sides in the x-axis direction, thereby reducing the deviation of the ejection amount of powder.

Of course, in the design of the actual recoating device, there may not be much deviation in the ejection amount of powder depending on the position, but an ejection amount deviation at the level of deviation that may occur in terms of manufacturing, a deviation in the lamination process, and a deviation due to the influence of vibration for ejection control or distribution effect may always exist, and in this case, granting even a fine velocity component to powder in a direction perpendicular to the movement direction of the recoating device may obtain at least a meaningful effect.

Figure 7:
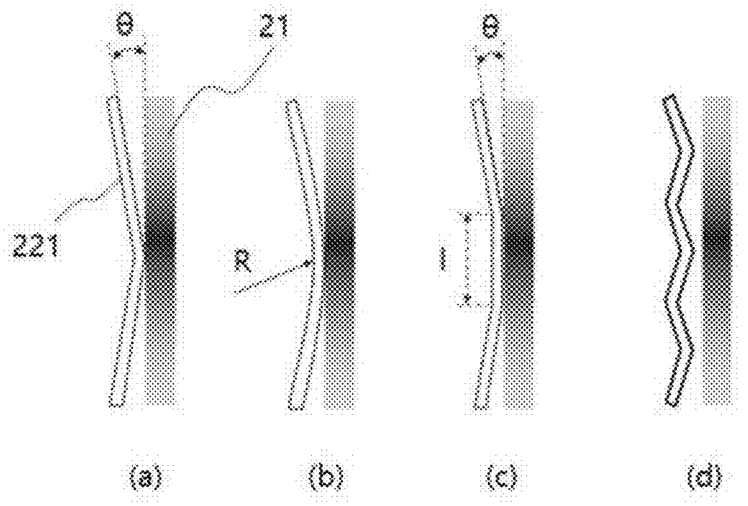
FIG. 7 is a diagram illustrating various exemplary embodiments of a leveling blade.

FIG. 7 is a diagram illustrating various exemplary embodiments of a leveling blade. Referring to FIG. 7, a structure for allowing powder to have a velocity component in the x-direction, which is a direction perpendicular to the movement direction of the recoating device. As shown in (a), the central portion may protrude toward the powder ejection port and both sides may be formed to be inclined at a certain angle (θ) opposite to the ejection port. As shown in (b), the protruding central portion may have a certain curvature (R). As shown in (c), the protruding central portion may be formed in a straight line with a certain length (l), and as shown in (d), a plurality of V-shaped slopes are formed.

All of these structures are designed to ensure that powder has a velocity component in the x direction perpendicular to the movement direction of power, when the recoating device moves for leveling, and the tilt angles or slope shape may be determined according to properties of powder, a lamination method of the 3D printer.

Figure 8:
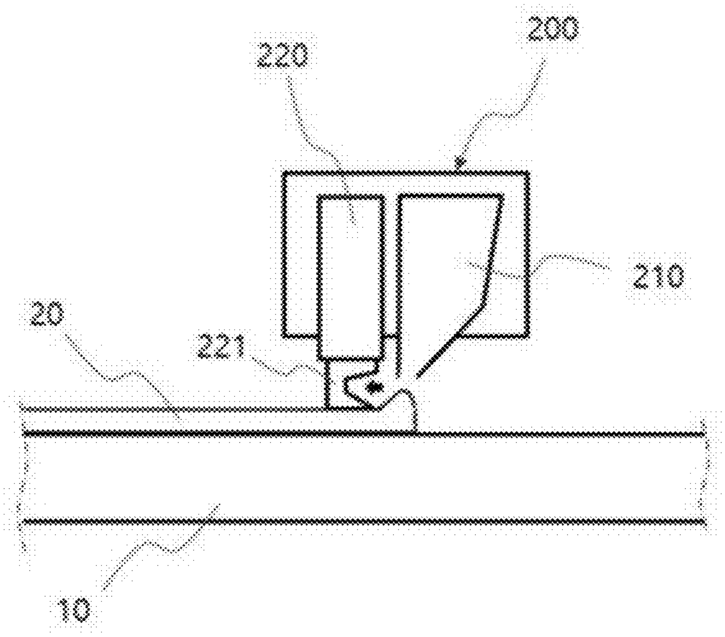
FIG. 8 is a diagram conceptually illustrating the shape of a leveling blade according to another exemplary embodiment of the present invention.

FIG. 8 is a diagram conceptually illustrating the shape of a leveling blade according to another exemplary embodiment of the present invention. If the leveling blade is tilted at an angle, the overall size of the recoating device may increase. Thus, as a method for providing the same effect but not increasing the area occupied by the blade, an indentation space may be formed in the height direction of the blade, thereby forming a flow through which the powder may be distributed.

Referring to FIG. 8, the leveling blade according to another exemplary embodiment of the present invention has a central portion that is indented in the z-direction, which is the height direction, opposite to the powder ejection port. In other words, the leveling blade has a straight line or a V-shaped slope with a small angle in the horizontal x-direction, but an indentation space is formed in the z-direction, which is the height direction of the blade, and a fluid flow allowing powder to be distributed may be formed by giving a deviation to an indentation amount or an indentation angle of the indentation space. That is, in another exemplary embodiment of the present invention, powder may move in the x-direction, which is a direction perpendicular to the movement direction of the recoating device by changing the shape and size of the indentation space formed in the height direction of the leveling blade.

Figure 9:
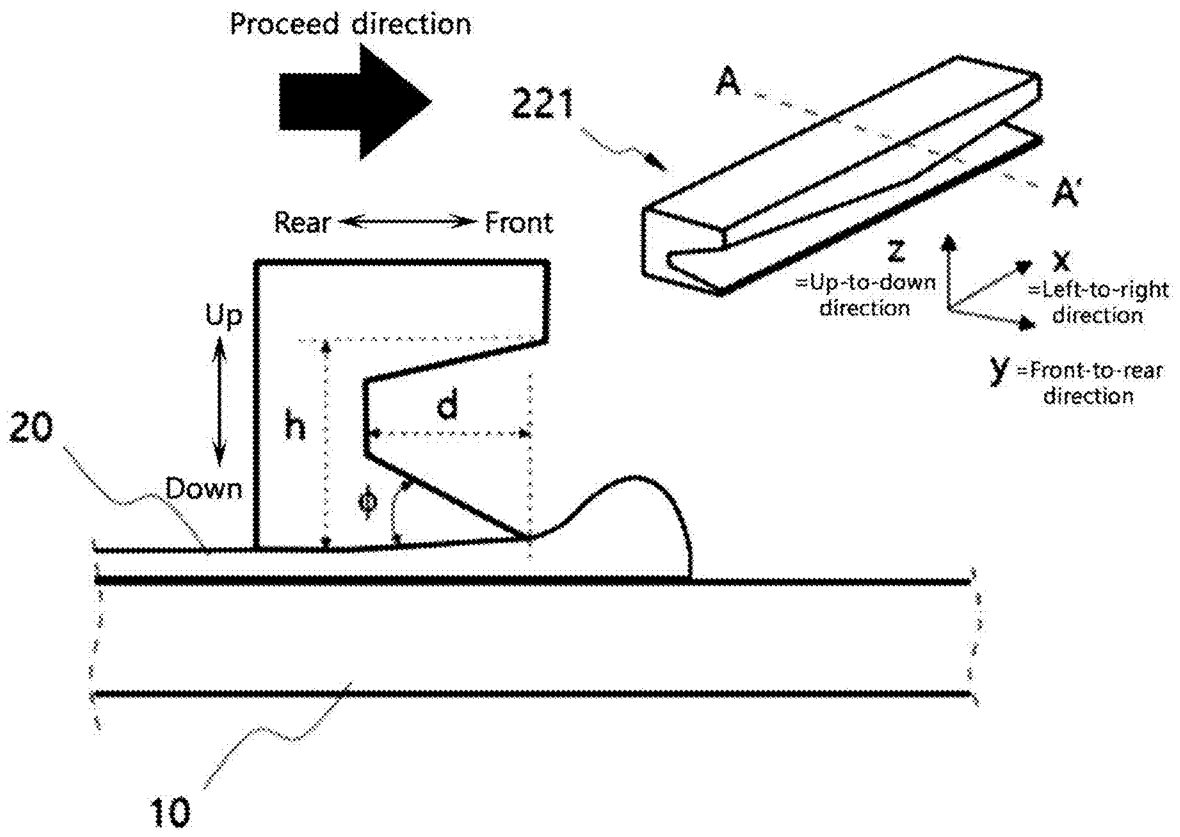
FIG. 9 is a diagram illustrating a detailed form of a leveling blade according to another exemplary embodiment of the present invention.

FIG. 9 is a diagram illustrating a detailed form of a leveling blade according to another exemplary embodiment of the present invention. Referring to FIG. 9, the indentation angle φ, the indentation depth d, and space height h of a space formed in the height direction of the leveling blade are changed, a fluid flow allowing powder to be distributed in the width direction of the leveling blade may be formed, and in this case, a small powder flow may be formed in the x direction according to the entry angle φ, a deep powder flow may be formed in the x-direction according to the indentation depth d, and a powder flow may be formed in the height direction according to the space height h.

Figure 10:
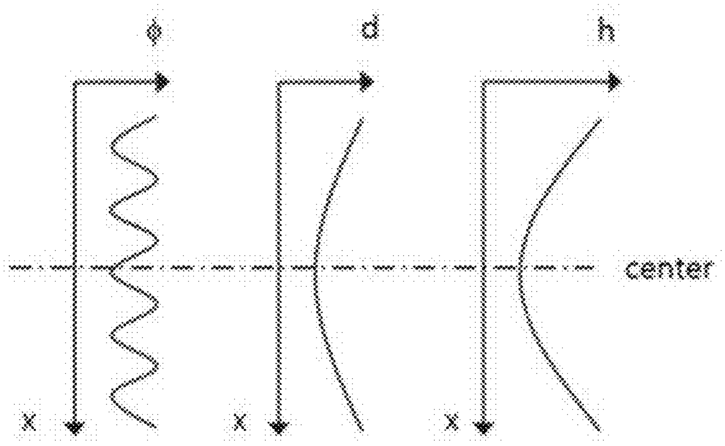
FIG. 10 is a diagram illustrating the influence of entry angle, indentation depth, and space height in an indentation space.

FIG. 10 is a diagram illustrating the influence of entry angle, indentation depth, and space height. Referring to FIG. 10, the entry angle φ may be formed to be lowest at the center and provide a change in the form of a sine wave on both sides to form a fine powder flow, through which a fast distribution flow to a neighboring position may be formed. Considering the flow when the ejection amount of powder increases, the indentation depth d is shallowest at the center and becomes deeper on both sides to form a distribution flow of powder outwardly. Considering the flow when the amount of powder is much larger, the space height h is lowest at the center and higher on both sides, thereby forming a distribution flow of powder outwardly. When the powder increases up to a height that fills the indentation space, the distribution flow of powder should be made faster, so in the case of space height h, the distribution flow speed may be increased by further increasing a difference between the center and the outside. In FIG. 9, all indentation spaces are shown as straight lines, but if the indentation spaces are formed in a curved shape with a certain curvature, the powder fluid flow may be better implemented.

Meanwhile, in addition to the ejection amount of powder deviation depending on the position of the recoating device described above, ejection amount deviation may occur depending on changes in recoating conditions. There are various factors that affect the ejection amount. For example, if the moving speed of the recoating device is increased to increase the 3D printing output speed, the ejection amount per unit area may decrease, and when vibration is applied to the recoating device and the vibration frequency is close to the natural frequency of the system, the ejection amount may increase. As the surrounding humidity decreases, the ejection amount of powder may increase, and as the sphericity of powder increases, the ejection amount may increase.

If the deviation in the ejection amount is small, like the deviation depending on the position of the recoating device, the problem may be solved by optimizing the shape of the leveling blade mentioned above. However, if the ejection amount deviation is larger due to changes in recoating conditions, deviations that are difficult to resolve using the blade shape alone may occur, and in this case, it is necessary to control the ejection port of the powder ejector.

In general, the powder ejection port is open through a narrow passage or mesh network and is set to start ejecting powder when vibration of a certain magnitude or greater occurs, and control of the powder ejector is implemented passively. However, in the case of implementing the design or control of the powder ejector manually, if large deviations in the ejection amount occur due to changes in recoating conditions or if the printer is set up in a constant temperature and humidity environment and 3D printing is performed in a general mass-production environment, large deviations in ejection amount may occur.

Figure 11:
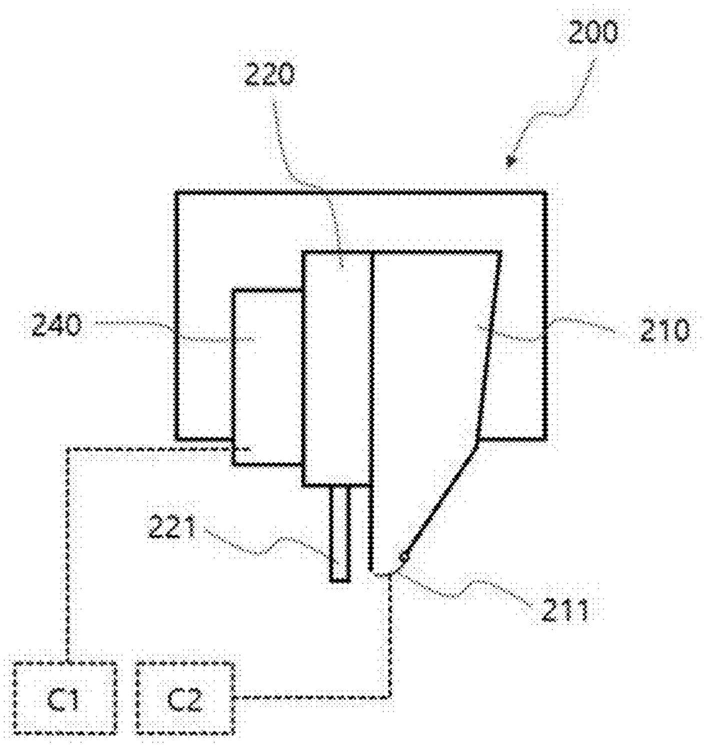
FIG. 11 is a diagram illustrating an exemplary embodiment including an ejection port opening and closing device.

In order to solve this problem, the present invention proposes a method of adding an opening and closing device to the powder ejection port and reducing the deviation of the ejection amount even when the surrounding environment or recoating conditions change through active control. FIG. 11 is a diagram illustrating an exemplary embodiment including an ejection port opening and closing device. Referring to FIG. 11, an opening and closing device that opens and closes through a vibration signal is formed at an ejection port. In this case, the opening and closing device may be controlled by setting a vibration frequency input signal, and the ejection amount of powder may be controlled by changing an input frequency. For example, the opening and closing device of the ejection device may be implemented so that a proportional relationship is formed in which the ejection amount increases as a given frequency increases. When the moving speed of the recoating device increases, the ejection amount may be increased by increasing the frequency as well in a proportional relationship, and as the humidity decreases due to environmental changes, the ejection amount may be reduced by lowering the frequency. If the sphericity of powder is high, the ejection amount may be reduced by lowering the frequency.

Meanwhile, in order to control the ejection amount by controlling the opening and closing device of the ejection device with frequency, the ejector and the excitation device of the compactor should be implemented separately. In the case of the existing powder bed-type recoating device, vibration for compaction and vibration for powder ejection are excited using a single excitation device, so separate control of the ejection amount cannot be performed. However, in the present invention, a vibration control C2 of the compactor is separated from an ejection amount control C1 of the ejector, thereby reducing the ejection amount deviation depending on the recoating environment.

The present invention is not limited to the above-described embodiments and various modifications may be made by a person skilled in the art to which the present invention pertains, without departing from the spirit of the invention as defined by the claims of the present invention, and such modifications also fall within the claims.

The invention claimed is:

1. A powder-based 3D printer including;

a build plate movable in a vertical direction and on which metal or non-metal powder is solidified and stacked;

a recoating device applying powder on the build plate;

a transfer device transferring the recoating device;

a powder supply device supplying powder to the recoating device; and a laser scanning unit or a binder jetting unit to bond the applied powder, wherein the recoating device includes an ejector ejecting powder and a leveler leveling the ejected powder, the leveler includes a leveling blade formed to be adjacent to an ejection port of the ejector and leveling the ejected powder, where a direction parallel to a proceed direction of the recoating device is referred to as a front-to-rear direction, with the proceed direction being the front and the opposite direction being the rear; a direction in which the leveling blade extends is referred to as a left-to-right direction; and a height direction perpendicular to the front-to-rear and left-to-right directions is referred to as a up-to-down direction, the leveling blade, when connecting outermost corners of the leveling blade, a three-dimensional shape with a front and a back is formed, wherein a portion of the front of said three-dimensional shape is recessed toward the back to form an indentation space, and an inclined surface is formed at a front lower end of the leveling blade by said indentation space, the indentation space is defined by an indentation depth (d), which is the depth of the indentation space from the front in the front-to-rear direction; a space height (h), which is a distance in the up-to-down direction from a bottom surface of the leveling blade to an upper edge of a front opening of the indentation space; and an entry angle (φ), which is the angle of inclination between the inclined surface and the bottom surface of the leveling blade; wherein at least one of the indentation depth (d), the space height (h), and the entry angle (φ) is configured to vary depending on a position of the leveling blade in the left-to-right direction, and wherein the leveling blade generates a flow of powder in a direction perpendicular to a movement direction of the recoating device.

2. The powder-based 3D printer of claim 1, wherein the leveling blade has a slope so that a central portion in the left-to-right direction protrudes toward the ejection port and both sides in the left-to-right direction are inclined toward the opposite side of the ejection port.

3. The powder-based 3D printer of claim 2, wherein the leveling blade is formed so that the protruding central portion has a certain curvature.

4. The powder-based 3D printer of claim 2, wherein the leveling blade is formed in a straight line with the protruding central portion having a certain length.

5. The powder-based 3D printer of claim 2, wherein the leveling blade includes a plurality of V-shaped slopes.

6. The powder-based 3D printer of claim 2, wherein opening and closing device is formed at the ejection port to open and close the ejection port, and the opening and closing device is opened and closed according to a vibration frequency.

7. The powder-based 3D printer of claim 1, wherein the indentation depth (d) is shallowest at a center of the leveling blade in the left-to-right direction and becomes deeper toward both sides.

8. The powder-based 3D printer of claim 1, wherein the space height (h) is formed to be lowest at a center in the left-to-right direction and higher on both sides.

9. The powder-based 3D printer of claim 1, wherein the entry angle (φ) is lowest at a center in the left-to-right direction and is formed to change in the form of a sine wave on both sides.

10. The powder-based 3D printer of claim 9, wherein the recoating device further includes a compactor including an excitation device for compacting leveled powder, and the excitation device for compacting the leveled powder is formed to be controlled independently of vibration for opening and closing an opening and closing device.

* * * * *